(12) United States Patent
Ichtertz

(10) Patent No.: US 7,761,698 B2
(45) Date of Patent: Jul. 20, 2010

(54) METHOD FOR REPLACING A FIELD DEVICE OF AUTOMATION TECHNOLOGY

(75) Inventor: Francois Ichtertz, Habsheim (DE)

(73) Assignee: Endress + Hauser Process Solutions AG, Reinach (CH)

( * ) Notice: Subject to any disclaimer, the term of this patent is extended or adjusted under 35 U.S.C. 154(b) by 621 days.

(21) Appl. No.: 11/806,708

(22) Filed: Jun. 4, 2007

(65) Prior Publication Data

US 2008/0005550 A1    Jan. 3, 2008

(30) Foreign Application Priority Data

Jun. 7, 2006    (DE)    ............ 10 2006 27 012

(51) Int. Cl.
*G06F 15/177*    (2006.01)
(52) U.S. Cl. .......................... 713/1; 713/100
(58) Field of Classification Search .............. None
See application file for complete search history.

(56) References Cited

U.S. PATENT DOCUMENTS

| | | | |
|---|---|---|---|
| 4,774,844 A | 10/1988 | Davis | |
| 5,757,265 A * | 5/1998 | Kogure et al. | ............ 340/508 |
| 5,776,548 A | 7/1998 | Rukavina | |
| 6,473,656 B1 * | 10/2002 | Langels et al. | ............ 700/17 |
| 2004/0260405 A1 * | 12/2004 | Eddie et al. | ............ 700/3 |
| 2008/0189526 A1 * | 8/2008 | Sokolova et al. | ............ 712/226 |
| 2008/0250162 A1 * | 10/2008 | Nixon et al. | ............ 710/10 |

FOREIGN PATENT DOCUMENTS

DE    196 24 929 A1    1/1998
GB    2 403 042 A    12/2004

* cited by examiner

Primary Examiner—Dennis M Butler
(74) Attorney, Agent, or Firm—Bacon & Thomas, PLLC

(57) ABSTRACT

A method for replacement of an automation technology field device F1 connected with a fieldbus FB and having at least a first function block FB1 communicating via the fieldbus FB, via a communication relationship KR, with a second function block FB2 in a further field device F2 connected with the fieldbus FB Configuration data CD of the field device F1 are transmitted into a memory unit MU connected with the fieldbus FB and subsequently transmitted into a replacement field device F1'. Following installation of a selector function block SFB into the communication relationship KR between the first function FB1 and the second function block FB2 and connecting of the selector function block SFB with function block FB1' of the replacement field device F1' corresponding to the function block FB1, the selector function block SFB is switched so that the function block FB1' communicates with the second function block FB2. This provides for simple device replacement in a fieldbus system.

5 Claims, 2 Drawing Sheets

METHOD FOR REPLACING A FIELD DEVICE OF AUTOMATION TECHNOLOGY

The invention relates to a method for replacing a field device of automation.

In the practice of automation, especially process automation, field devices are often applied for registering and/or influencing process variables. Examples of such field devices are fill level measuring devices, mass flow measuring devices, pressure and temperature measuring devices, etc., which, as sensors, register the corresponding process variables fill level, flow, e.g. flow rate, pressure and temperature.

BACKGROUND DISCUSSION

Serving for influencing process variables are field devices in the form of actuators, which e.g., as valves, influence the flow of a liquid in a section of pipeline, or, as pumps, influence level in a container.

A large number of such field devices are manufactured and sold by the firm, Endress+Hauser.

As a rule, field devices in modern fabrication plants are connected via communication networks (Profibus, Fieldbus Foundation, etc.) with superordinated units (e.g. control systems, control units). These superordinated units serve for process control, process visualization, process monitoring, as well as for start-up and servicing of the field devices.

Designated as field devices are, in general, also units directly connected to a fieldbus and serving for communication with the superordinated units (e.g. remote I/Os, gateways, linking devices).

Fieldbus systems can be integrated into enterprise networks working on an Ethernet basis. In this way, process and field device data can be accessed from different regions of an enterprise.

For worldwide communications, the enterprise networks can also be connected with public networks, such as the Internet.

For the servicing of field devices, servicing programs are needed (e.g. FieldCare of Endress+Hauser; Pactware; AMS of Emerson; Simatic PDM of Siemens). Serving for plant control and monitoring are control system applications (e.g. Simatic PCS7 of Siemens; Symphony of ABB; DeltaV of Emerson).

For a plant operator, a high plant availability is of enormous importance. Longer plant downtimes are to be avoided as much as possible, since, most often, significant disadvantages, among others, financial losses, are associated therewith.

The loss of a single field device on a fieldbus system can lead to shutdown of an entire plant. As a rule, the relevant, malfunctioning field device must be replaced. Therefore, device replacement should be capable of being performed as rapidly as possible. A few field device manufacturers offer field devices, which have a removable memory module, in which device parameters important for device functionality are stored, device parameters such as the units of the measured values, alarm limits, TAG-name of the measuring point, etc. In the case of a device replacement, this memory module can easily be inserted into the replacement device. Therefore, the replacement device can be brought quickly into operation, so that the plant can again run.

In the case of the fieldbus system, Fieldbus Foundation, field devices also assume control functions with reference to control loops, this being referred to as "Control in the Field". These control functions are implemented via so-called "function blocks". An example of such a function block is a PID block, which can communicate via the fieldbus with other function blocks.

In the case of field devices, which have function blocks, a device replacement is significantly more complicated. As a rule, a device replacement in this case requires the presence of a service technician at the field device and a plant operator monitoring the plant from a control location, e.g. a control room. Generally, a device replacement in the case of such fieldbus systems requires considerably more know-how. Frequently, a device malfunction will occur at an unfavorable time, such as in the night, or on a weekend, when personnel properly schooled for a device replacement are not available.

In many cases, for this reason, plants will even be designed from the beginning to be fully redundant, a practice which is, of course, associated with significant costs.

SUMMARY OF THE INVENTION

An object of the invention is, therefore, to provide a method for replacement of a field device of automation technology avoiding the above-described disadvantages, while enabling especially a rapid and simple device replacement in the case of field devices, which perform control functions.

This object is achieved by a method including: loading configuration data of a field device into a memory unit connected with a fieldbus; connecting a replacement field device with the fieldbus; transmitting the configuration data into the replacement field device; installing a selector function block into a communication relationship between a first function block and a second function block; connecting the selector function block with a replacement field device function block located in the replacement field device and corresponding to the first function block; and switching the selector function block so that the replacement field device function block communicates with the second function block.

An essential idea of the invention is to load configuration data of the field device marked for replacement into a memory unit and, then, following connecting of a replacement field device with the fieldbus, to transmit such data into the replacement device.

Via a selector function block, the relevant function blocks in the field device to be replaced, in the replacement field device and in a further field device are linked together. When this linking has been effected, the selector block is so switched, that a function block in the replacement field device communicates with the function block in the further field device.

BRIEF DESCRIPTION OF THE DRAWINGS

The invention will now be explained in greater detail on the basis of an example of an embodiment presented in the drawing, the figures of which show block diagrams as follows.

DETAILED DESCRIPTION

Figure 1:
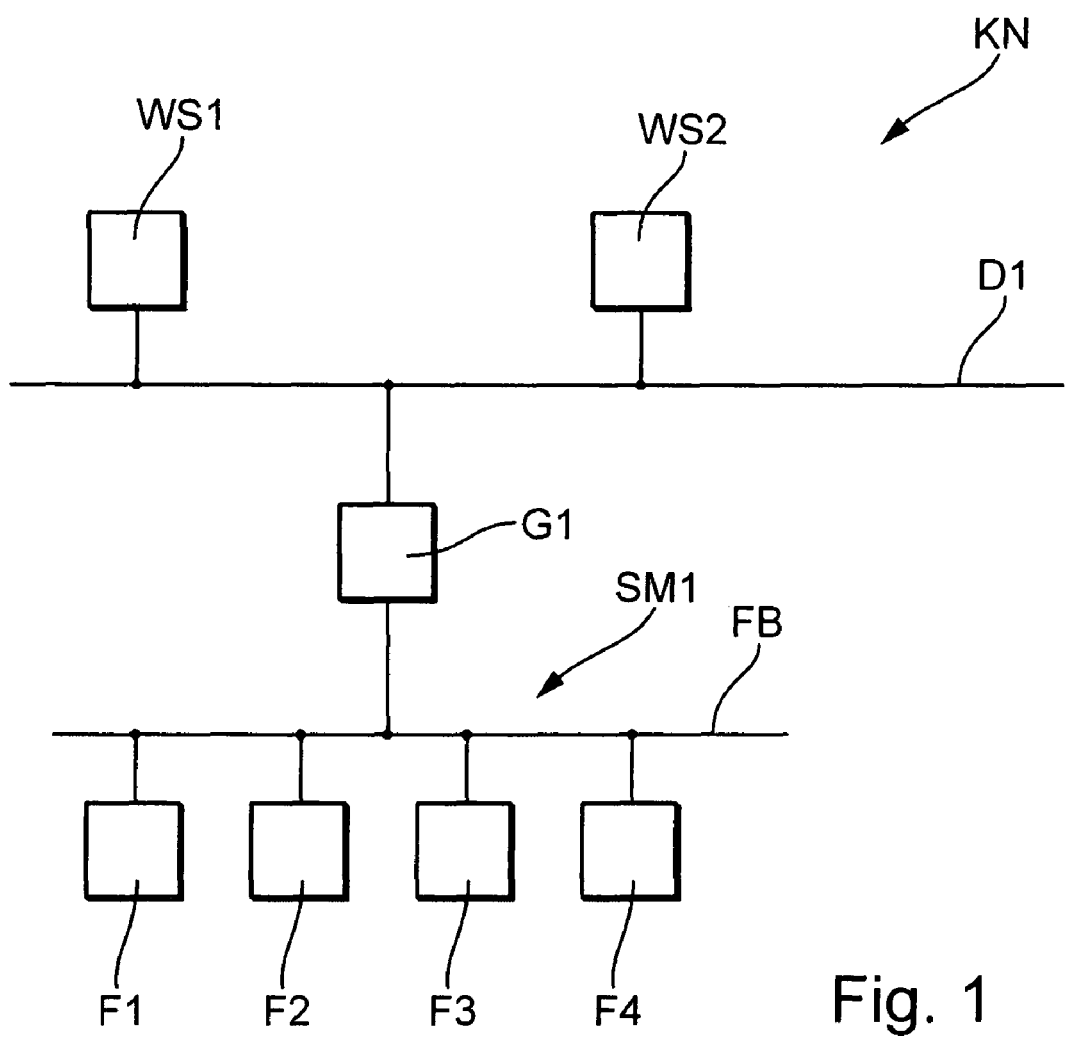
FIG. 1 a network of automation technology.

FIG. 1 provides more detail for an automation technology network in the form of communications network KN. To a databus D1 are connected a plurality of computer units, e.g.

workstations WS1, WS2. These computer units serve as superordinated units (control systems or units) for, among other purposes, process visualization, process monitoring and engineering, as well as for servicing and monitoring field devices. Databus D1 works e.g. according to the HSE-(High Speed Ethernet)-Standard of Fieldbus Foundation. Via a gateway G1, which is also referred to as a linking device or field controller, the databus D1 is connected with a fieldbus segment SM1. Fieldbus segment SM1 includes a plurality of field devices F1, F2, F3, F4, which are connected with one another via a fieldbus FB. Field devices F1, F2, F3, F4 can be any assortment of sensors and/or actuators. Fieldbus FB works according to the Fieldbus Foundation fieldbus standard.

Figure 2:
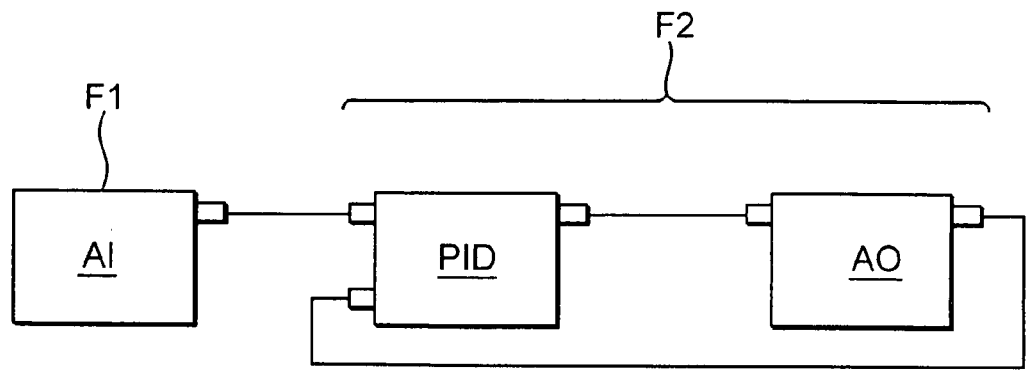
FIG. 2 a small control loop including a plurality of function blocks.

FIG. 2 shows a small control loop (PID controller) with a plurality of function blocks. An analog-input block AI, a PID-block PID and an analog-output block AO are arranged to communicate with one another as shown. This control loop is configured during start-up of the fieldbus system. The control strategy, i.e. the control loop, is set up with a corresponding tool, e.g. ControlCare of the firm Endress+Hauser, and then transmitted by download into the field devices. The block AI is provided in a sensor, e.g. the field device F1. The block PID and the block AO are provided in an actuator, e.g. the field device F2.

The block PID can, in principle, be provided in each of the other field devices F1, F3, F4 or in the gateway G1. Some function blocks, such as AI-blocks and DO-blocks, are already pre-installed in the field devices.

The time sequencing of communications in the control loop is controlled by a so-called link-active-scheduler LAS. It controls bus activities with the help of various commands, which it sends to the individual bus participants. Devices which carry out the function of the LAS are referred to as link masters. Since the LAS continually queries even unoccupied device addresses, it is possible to connect field devices to the fieldbus during ongoing operation and to integrate them into the ongoing operation. In the present case, the LAS is provided in the gateway G1.

In principle, one distinguishes, in the case of a Fieldbus Foundation fieldbus, between cyclic and acyclic communications. Time critical tasks, such as e.g. control of the process variables via the control loop, are performed exclusively via cyclic communications. Parametering and diagnosis of field devices occurs via acyclic communication. In order to be able to perform all communications tasks at correct points in time and without access conflicts, cyclic communications are executed according to a fixed processing time plan, which is cyclically repeated. One cycle of the processing time plan is referred to as a macrocycle.

The communications of the participants of a Fieldbus Foundation fieldbus occur according to the publisher-subscriber principle.

As already indicated, for each device (bus participant), the point in time is fixed, at which the device is requested by the LAS to send its cyclic data. The queried device (the publisher) then publishes its data, such as a measured value, via the fieldbus. These data are then read by all devices which have been configured as subscribers for these data.

Figure 3:
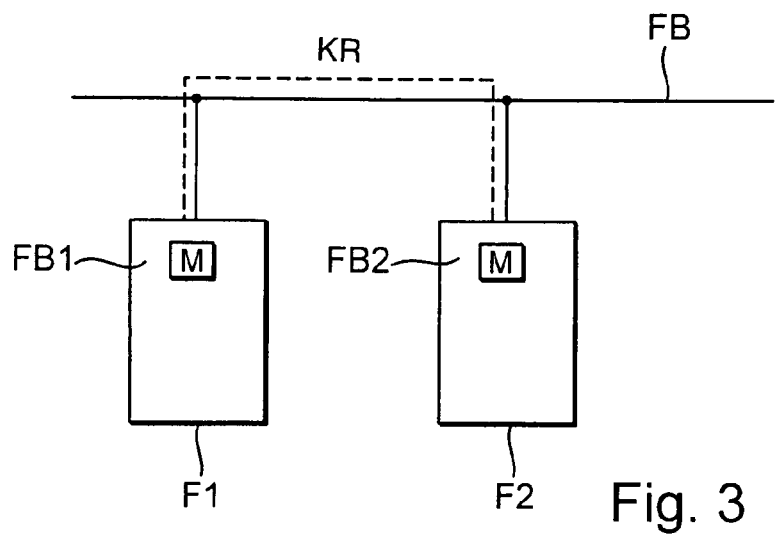
FIG. 3 a schematic illustration of the publisher-subscriber principle.

FIG. 3 schematically illustrates the publisher-subscriber principle on the basis of the two field devices F1, F2 with simplified, very generally illustrated, function blocks FB1 and FB2. Field device F1 is the publisher for a measurement value M, while field device F2 is the subscriber for this measurement value M. Communication between the two function blocks FB1 (e.g. analog-input block) and FB2 (e.g. PID block) occurs via the communication relationship KR.

Figure 4:
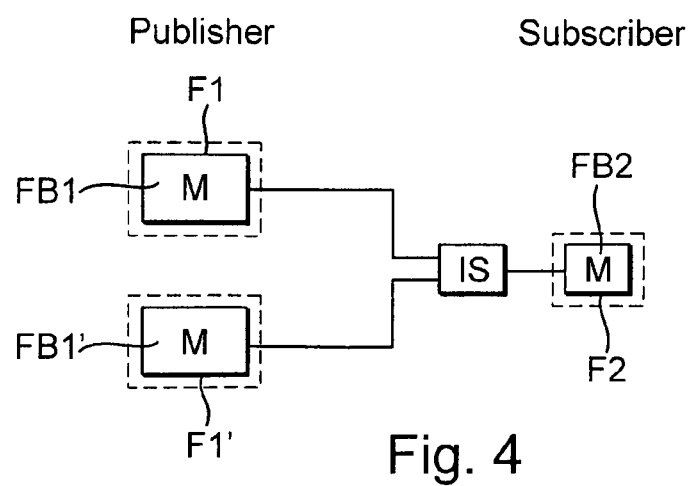
FIG. 4 a schematic illustration of an example of an embodiment of the invention.

FIG. 4 schematically illustrates the invention on the basis of an example of an embodiment. In this case, a replacement field device F1' is already connected with the fieldbus FB. Field device F1' has a function block FB1'. These two function blocks FB1 and FB1' communicate with a selector function block SFB (input selector IS), which is provided in the gateway G1. Selector function block SFB is additionally connected with the function block FB2 in the field device F2. Via the selector function block SFB, a choice can be made, as to which function block FB1, respectively FB1', is connected with the function block FB2.

The method of the invention will now be explained in greater detail.

In a first method step, the configuration data C of the field device F1 is loaded into a memory unit MU connected with the fieldbus FB. The memory unit MU is provided, advantageously, in the gateway G1.

The configuration data include, above all, the configuration data for the function blocks. Thus, special configuration data are read out of the "virtual field device" VFD. The virtual field device enables remote representation of local device data, which are described in the object dictionary. A typical field device has at least two VFDs. This permits access to the network management information base (NMIB), the system management information base (SMIB), and function block application (FBAP) data.

Very generally, configuration parameters, calibration information, function block parameters, network parameters, links/VCR information, and scheduling information, as the case may be, can be read out.

With this information, a list of the subscribers assigned to the field device F1 can be produced in the gateway G1.

An option is to read into the memory unit MU the configuration data of all field devices connected to the fieldbus FB according to the configuration of the bus system. Then, all necessary data are available at any time. Updating must, however, then be performed as required.

Simpler is to read only the data out of that field device, which must be replaced. Via error reports, the gateway G1 can recognize which field device will potentially need to be replaced, and, in this way, the gateway also knows to which field device a field device newly connected to the fieldbus must be assigned.

In a second method step, a replacement field device F1', which is to replace the field device F1, is connected with the fieldbus FB.

In a third method step, the configuration data CD of the field device F1 is transmitted from the memory unit MU into the field device F1'. In this way, field device F1' has a functionality equal to that of the field device F1. Field device F1' measures, in the same way as the field device F1, e.g. the temperature at a measuring point.

In a method step, a selector function block SFB is installed into the communication relationship KR, i.e. the function block FB1 communicates with the function block FB2 via the selector function block SFB.

In a further method step, the selector function block SFB is connected additionally with the function block FB1'.

When all linkages between the function blocks have been properly established, then the selector function block SFB can be so controlled, that the input no longer comes from function block FB1, but, instead, from function block FB1'. Then, field device F1 is no longer needed and can be disconnected from the fieldbus.

The control loop works now without problem with field device F1' and no longer with field device F1.

Device replacement is, in this way, considerably simplified.

The method of the invention is suited not only for replacement of malfunctioning devices but also for precautionary maintenance, in the context of predictive maintenance. Also in this case, of great advantage is the fact that an interruption of plant operation is not required for the replacement.

The invention claimed is:

1. A method for replacement of an automation technology field device (F1) connected with a fieldbus (FB) and having at least a first function block (FB1) communicating via the fieldbus (FB), via a communication relationship (KR), with a second function block (FB2) in a further field device (F2) connected with the fieldbus (FB), comprising the steps of:

loading configuration data (CD) of the field device (F1) into a memory unit (MU) connected with the fieldbus (FB);

connecting a replacement field device (F1') with the fieldbus (FB);

transmitting the configuration data (CD) of the field device (F1) into the replacement field device (F1');

installing a selector function block (SFB) into the communication relationship (KR) between the first function block (FB1) and the second function block (FB2);

connecting the selector function block (SFB) with a replacement field device function block (FB1') located in the replacement field device (F1') and corresponding to the first function block (FB1); and switching the selector function block (SFB), so that the replacement field device function block (FB1') communicates with the second function block (FB2).

2. The method as claimed in claim 1, wherein:

the memory unit (MU) is provided in a master unit, which controls time sequence of communication in a control loop with a plurality of function blocks.

3. The method as claimed in claim 1, wherein:

only following detection of a malfunction of a field device are pertinent configuration data transmitted into the memory unit (MU).

4. The method as claimed in claim 1, wherein:

configuration data of all field devices are transmitted into the memory unit (MU).

5. The method as claimed in claim 1, wherein:

the fieldbus (FB) works according to a Fieldbus Foundation standard.

* * * * *